United States Patent [19]
Leonard

[11] 3,833,013
[45] Sept. 3, 1974

[54] SELF-VALVING FLUID RESERVOIR AND BUBBLE TRAP
[75] Inventor: Ronald J. Leonard, Elk Grove Village, Ill.
[73] Assignee: Baxter Laboratories, Inc., Morton Grove, Ill.
[22] Filed: Apr. 6, 1972
[21] Appl. No.: 241,622

[52] U.S. Cl............ 137/171, 23/258.5, 128/214 R, 128/214 F, 137/493, 251/5
[51] Int. Cl............................................. A61m 5/00
[58] Field of Search......... 128/214 R, 214 E, 214 F, 128/274; 23/258.5; 137/171, 493, 525; 251/5

[56] References Cited
UNITED STATES PATENTS
| | | | |
|---|---|---|---|
| 2,107,596 | 2/1938 | Bourdon | 137/493 X |
| 3,023,750 | 3/1962 | Baron | 128/214 F |
| 3,298,391 | 1/1967 | Savage | 137/493 |
| 3,469,582 | 9/1969 | Jackson | 251/5 UX |
| 3,620,248 | 11/1971 | Cary | 137/493 |
| 3,687,365 | 8/1972 | Laessig | 251/5 X |
| 3,717,174 | 2/1973 | De Wall | 137/525 X |
| R26,006 | 4/1966 | Gewecke | 128/214 F |

FOREIGN PATENTS OR APPLICATIONS
1,254,883  1/1961  France............................... 137/493

Primary Examiner—William R. Cline
Assistant Examiner—Gerald A. Michalsky
Attorney, Agent, or Firm—W. Garrettson Ellis

[57] ABSTRACT

A self-valving fluid reservoir and bubble trap for a fluid flow line is disclosed which comprises a tubular conduit carrying a transverse, flow-blocking partition in the conduit flow path. The conduit defines upstream and downstream lateral ports on each side of the partition to permit fluid communication between the interior and exterior of the conduit. A flexible, expansible and collapsible, sealed reservoir chamber is mounted on the conduit to enclose the lateral ports. The chamber receives excess fluid in the flow line by expansion, but collapses against and occludes the downstream port or ports in the absence of excess fluid in the reservoir chamber.

6 Claims, 5 Drawing Figures

PATENTED SEP 3 1974 3,833,013

SELF-VALVING FLUID RESERVOIR AND BUBBLE TRAP

BACKGROUND OF THE INVENTION

The invention of this application relates to a fluid valve and reservoir for use in a flow line, which device also serves as a bubble trap. Thus, three important functions can be provided by one simple structure.

In particular, the device of this invention is contemplated for use in a system for the oxygenation of blood by means of a membrane oxygenator, which functions as a lifesaving artificial lung during open heart surgery or other situations where breathing becomes severely impaired.

The basic advantage of the membrane type oxygenator as against bubble type oxygenators in total or partial support of respiration is that membrane oxygenators cause less damage to blood cells, and thus can be used for longer periods of time. This results at least in part from the fact that there are no significant harmful blood-gas interfaces in a membrane oxygenator. However, such blood-gas interfaces are still found in the bubble trap of membrane oxygenator circuits. The bubble trap is necessary in the system for safety to remove any incidental gas bubbles that may be formed.

Also, membrane type blood oxygenators are often used with a blood pump located downstream from the oxygenator, to raise the pressure of the oxygenated blood sufficiently to permit its return to the body through an artery. In this way, the oxygenator is not subject to high arterial pressures, which might harm the delicate membranes of the oxygenator. Additionally, the use of a pump downstream from the oxygenator permits the blood to be returned to the body in a pulsatile manner if desired.

A problem with the use of a pump downstream from the oxygenator, however, is that in the event of a reduced blood flow for any reason through the oxygenator or increased pump output, there is a danger that the pump may exert a substantial suction or negative pressure on the oxygenator. This can damage the membranes and cause them to rupture, permitting gas bubbles to pass into the blood line.

Furthermore, a reservoir for excess blood is required in the system for safety, to compensate for changes in blood volume that occur during any variation of flow rates.

The device of this invention serves as a reservoir and an effective bubble trap having little or no blood-gas interface, and likewise provides effective protection to the membrane oxygenator against any severe suction or negative pressure which may be created by the blood pump.

DESCRIPTION OF THE INVENTION

In accordance with this invention, a self-valving fluid reservoir for a fluid flow line, and particularly a blood flow line, is provided. The reservoir comprises a tubular fluid flow conduit which carries a transverse, flow-blocking partition within its flow path. The conduit defines upstream and downstream lateral ports on each side of the partition to permit fluid communication between the interior and exterior of the conduit. A flexible, expansible and collapsible, sealed reservoir chamber is mounted on the conduit and encloses the lateral ports. Thus the chamber can receive excess fluid and expand to serve as a reservoir. However, in the event of suction or negative pressure downstream from the reservoir, it collapses against and occludes the downstream port or ports to prevent the suction from passing upstream. Also, the collapsible chamber serves as a bubble trap, since gas bubbles passing out of the upstream port into the collapsible reservoir chamber tend to migrate upwardly and never reach the downstream port.

The collapsible chamber, being of variable volume, tends to assume the shape of the blood present in the chamber, preventing the formation of any large sized blood-gas interface.

Referring to the drawings, FIG. 1 is a diagrammatic view of a fluid flow line in which the reservoir of this invention is included.

Figure 1:
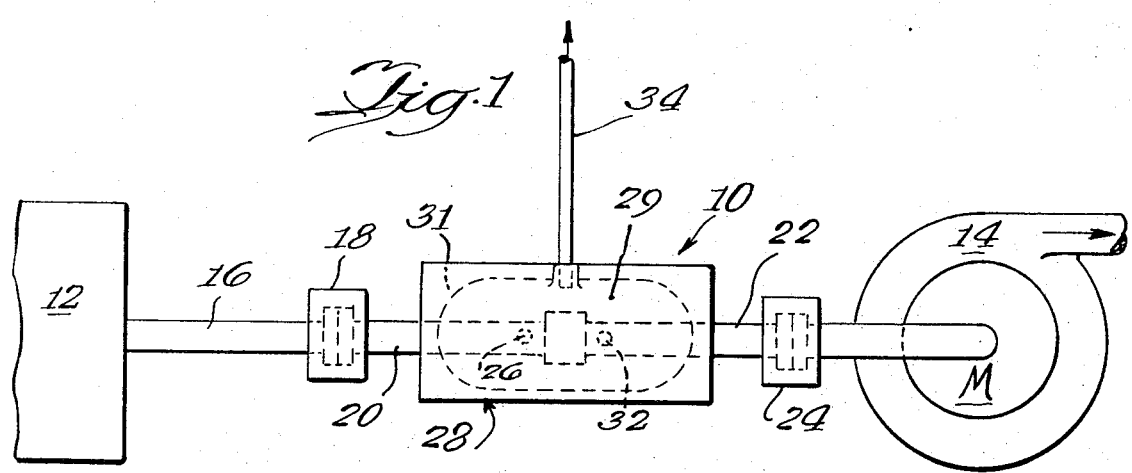

Referring to the drawings, reservoir 10 is shown to be connected in fluid flow relationship in a portion of a blood circulating system incorporating a membrane oxygenator 12 upstream of reservoir 10 and a pump for the blood 14 downstream thereof. Typically, this system involves a cannula in the vein or veins of the patient for drawing blood from the patient, and tubing for conveying it to oxygenator 12. After oxygenation, the blood passes through line 16 and a conventional tube coupling means 18 to upstream conduit 20 of reservoir 10. The blood leaves reservoir 10 through downstream conduit 22, through a second conventional tube coupler 24, into pump 14, and from there through another cannula back to the patient by way of an artery.

Figure 2:
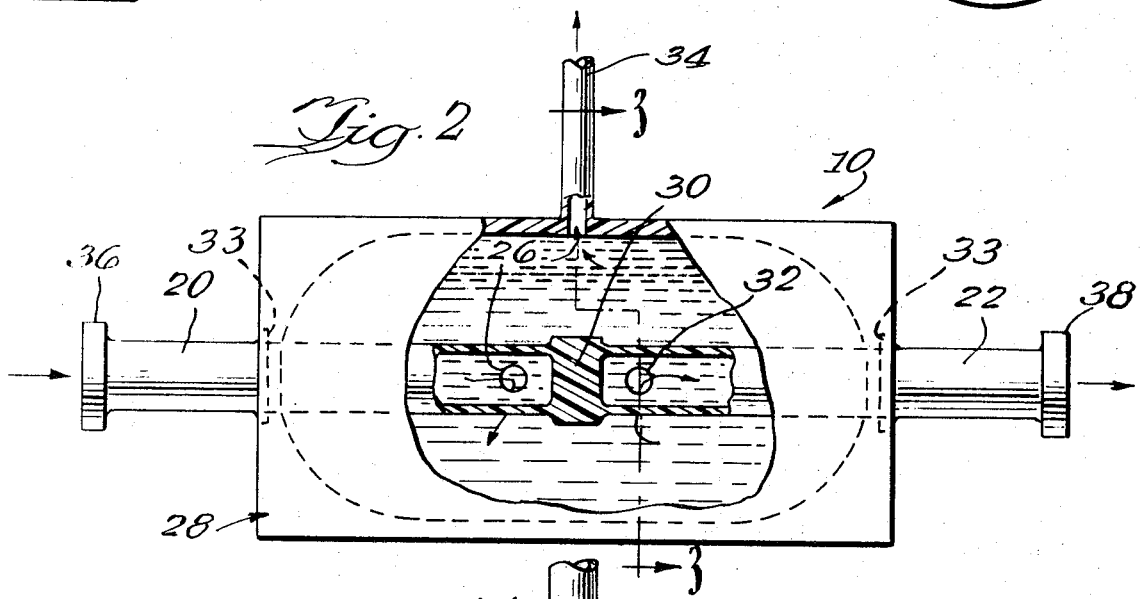
FIG. 2 is an elevational view, with portions broken away, of the reservoir of this invention.

FIG. 2 shows the reservoir of this invention in greater detail. The blood or other fluid entering the reservoir by means of upstream conduit 20 passes through one or more upstream lateral ports 26 to the exterior of upstream conduit 20, which area is enclosed in a flexible, expansible and collapsible, sealed chamber 28, made from a pair of flexible sheets 29, 31 heat sealed at their edges. Optional sealing rings 33 provide a fluid-tight seal between the walls of chamber 28 and conduit 20, 22. Partition 30 blocks the flow path through conduit 20, 22 to force the blood out of upstream ports 26.

Chamber 28 expands and collapses to accommodate the amount of blood that it contains, which amount may vary if the flow rate through oxygenator 12 or the pumping rate of pump 14 is altered.

Figure 4:
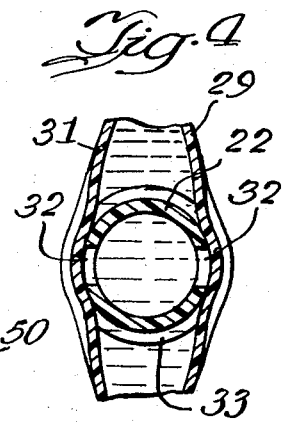
FIG. 4 is a sectional view similar to FIG. 3, showing the reservoir in collapsed configuration.

Normally, blood flows out of sealed chamber 28 through dowstream lateral ports 32, and from there out of downstream conduit 22 at a rate approximating the inflow rate through upstream ports 26. However, in the event that the suction rate of pump 14 is increased, or the flow rate through oxygenator 12 is decreased, chamber 28 will suffer a net loss of blood, until a suction or negative pressure begins to be felt in the chamber. However, the suction is not permitted to pass through chamber 28 because the walls 29, 31 will in that circumstance collapse to block flow through outlet ports 32 in the manner shown in FIG. 4. Thus, the suction is confined to conduit 22.

Figure 3:
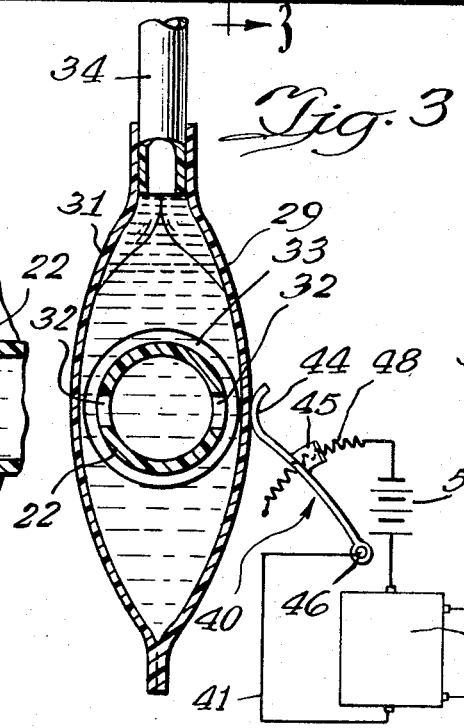
FIG. 3 is a sectional view taken along line 3—3 of FIG. 2 showing the reservoir in partially expanded condition, such as when it is partially full of blood or other fluid, and also showing certain electrical sensing equipment diagrammatically.

The normal flow position in which walls 29, 31 are held away from outlet ports 32 by fluid in chamber 28 is shown in FIG. 3.

Accordingly, the device of this invention serves both as a reservoir to accommodate small changes of blood volume due to changing flow rates, and also acts as a valve to prevent negative pressure or suction upstream from the reservoir 10.

Any gas bubbles which are expelled through upstream lateral ports 26 have a tendency to rise upwardly to the vicinity of outlet port 34, through which they can be removed. Outlet port 34 can also be covered with a latex cap or the like to serve as a seal through which an injection needle can be placed. When it is desired to draw gas off from the system, a needle is simply inserted through the seal into outlet port 34, and the gas sucked up and withdrawn in sterile manner.

Another advantage of the reservoir of this invention is that the blood volume of the reservoir can be automatically sensed by, for example, a magnetic leaf switch which is tripped when the expansible chamber 28 expands to a predetermined width because of the amount of fluid contained in it. This switch can be used to trip an alarm, or a more sophisticated system can be used to automatically adjust the flow rate of the motor 52 controlling pump 14. Thus, by the simple expedient of measuring the degree of expansion of walls 29,31 by a variable rate control system, the fluid balance in the entire system can be effectively and automatically controlled by the automatic adjustment of pump 14.

For example, as shown in FIG. 3, a pivotable leaf 44 rests against sheet 29, so that as sheet 29 expands, leaf 44 pivots about pivot 46 to provide a sliding electrical connection between terminal 45, carried by leaf 44, and rheostat 48. This in turn provides a variable electrical current in the circuit 41 powered by electrical source 50 depending upon the angular position of leaf 44. This current is received by conventional motor speed control 52 which is electrically connected to motor M to control the flow rate of pump 14 by means of motor M in a manner responsive to the current in circuit 41. Hence, when sheet walls 29, 31 expand, terminal 45 moves along rheostat 48 toward battery 50, increasing the current in circuit 41. This causes motor M to increase the output of pump 14, which tends to drain fluid from chamber 28, causing walls 29, 31 to partially collapse again. Accordingly, terminal 45 is moved along rheostat 48 away from battery 50, reducing the current in circuit 41 and correspondingly reducing the output of pump 14. Thus an equilibrium condition can be automatically achieved.

Figure 5:
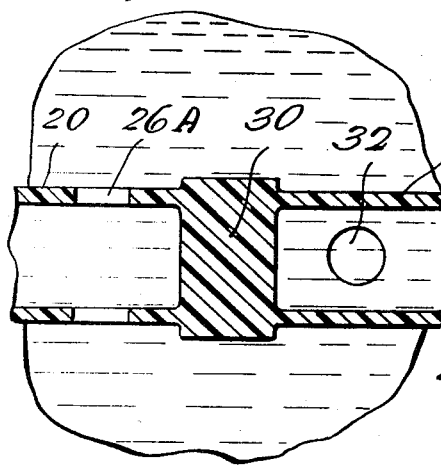
FIG. 5 is a fragmentary elevational view, with portions broken away, showing an alternate arrangement of the lateral ports in the tubular fluid flow conduit.

Referring to FIG. 5, a variant of the structure of FIG. 2 is disclosed in which lateral inlet ports 26A are shown to be rotated 90° from their configuration in FIG. 2. The advantage of this is that, although in the presence of a negative pressure in conduit 22 the reservoir chamber walls 29, 31 collapse upon lateral outlet ports 32, the inflow of fluid through ports 26A is not blocked, since the radial plane of ports 26A defines a substantial angle to the plane of walls 29, 31 of reservoir chamber 28.

Each conduit 20, 22 carries a flange 36, 38 to facilitate coupling with any known conventional coupler to other tubing of corresponding shape.

The entire reservoir 10 is typically made of silicone rubber or other flexible, nonthrombogenic material, with side wall sheets 29,31 being desirably made of fabric-reinforced silicone rubber for added strength. Conduits 20, 22 are integral with each other to form a self-supporting "backbone" for collapsible reservoir container 28, to support container 28 and prevent it from collapsing under the weight of the fluids present.

The above has been offered for illustrative purposes only, and is not intended to limit the invention which is defined in the claims below.

That which is claimed is:

1. A self-valving fluid reservoir for a fluid flow line which comprises a tubular fluid flow conduit which carries a tranverse, flow-blocking partition within the flow path of said conduit, said conduit defining upstream and downstream lateral port means on each side of the partition to permit fluid communication between the interior and exterior of said conduit, and a flexible, expansible and collapsible, sealed reservoir chamber mounted on said conduit and enclosing said lateral ports, said sealed chamber being elongated in a first direction normal to said fluid flow conduit with respect to a second direction normal to said first direction and said fluid flow conduit, to receive excess fluid by expansion, and to collapse against and occlude said downstream port means in the absence of excess fluid in said reservoir chamber, said fluid reservoir having a venting port defined in said reservoir chamber to remove gas bubbles collected in said chamber, said venting port being remotely spaced in said first direction from said fluid flow conduit, and a conduit carried exterior of said reservoir chamber, said conduit being in fluid communication with said venting port to receive gas bubbles therethrough.

2. The fluid reservoir of claim 1 in which said upstream port means is positioned for occlusion by said reservoir chamber in collapsed position.

3. The fluid reservoir of claim 1 in which said reservoir chamber comprises a pair of nonthrombogenic, elastomeric sheets sealed at their edges.

4. The fluid reservoir of claim 3 in which said sheets are fabric reinforced silicone rubber.

5. The fluid reservoir of claim 3 in which said upstream port means defines an angle to the plane of said elastomeric sheets, to facilitate flow therethrough when said reservoir chamber is in collapsed position.

6. The fluid reservoir of claim 3 in which all fluid-contacting parts thereof comprise silicone rubber.

\* \* \* \* \*